United States Patent [19]

Kretschmer, Jr. et al.

[11] Patent Number: 4,459,700

[45] Date of Patent: Jul. 10, 1984

[54] ADAPTIVE MTI SYSTEM

[75] Inventors: Frank F. Kretschmer, Jr., Laurel; Bernard L. Lewis, Oxon Hill; James P. Hansen, Waldorf, all of Md.

[73] Assignee: The United States of America as represented by the Secretary of the Navy, Washington, D.C.

[21] Appl. No.: 580,395

[22] Filed: May 28, 1975

[51] Int. Cl.³ .................... H04B 1/12; G01S 13/52
[52] U.S. Cl. ............................ 375/101; 328/165; 343/7.7; 375/102; 455/284; 455/296
[58] Field of Search ............... 343/7.7, 100 CL, 378; 325/474; 328/165; 455/284, 296; 375/96, 101, 102

[56] References Cited

U.S. PATENT DOCUMENTS

| 3,614,623 | 10/1971 | McAuliffe | 375/96 |
| 3,727,220 | 4/1973 | Brennan et al. | 343/7.7 |
| 3,775,768 | 11/1973 | Lisle et al. | 343/7.7 |
| 3,787,851 | 1/1974 | Hughes | 343/7.7 |
| 3,860,924 | 1/1975 | Evans | 343/7.7 |
| 3,876,947 | 4/1975 | Giraudon | 343/100 CL |
| 3,882,498 | 5/1975 | McGuffin | 343/7.7 |
| 3,932,818 | 1/1976 | Masak | 328/165 |

Primary Examiner—S. C. Buczinski
Attorney, Agent, or Firm—Robert F. Beers; William T. Ellis; Norman V. Brown

[57] ABSTRACT

An improved technique for eliminating interference in serial data samples having signal components which are desired to be removed before being further processed. A limited-iterative technique is employed to reduce components of the incoming data samples which are correlated among prior data samples.

3 Claims, 2 Drawing Figures

ADAPTIVE MTI SYSTEM

CROSS REFERENCE OF RELATED APPLICATIONS

The present invention is related to copending U.S. patent application No. 580,510 entitled "Adaptive Preprocessing System" by Bernard L. Lewis and Frank F. Kretchmer, Jr., filed in the United States on an even date herewith and assigned to the same assignee as the present invention.

BACKGROUND OF THE INVENTION

The present invention relates to improvements in signal processing systems and more particularly to improved techniques for eliminating interference or otherwise undesirable signal components from serial data samples to be processed by Moving Target Indicator type radar system processors.

Signal processing equipment for Moving Target Indicator (M.T.I.) radar systems (and similar type processing systes) in general is designed to receive only particular desired information for evaluation. However, as is often the case, the desired information is not isolated by itself, but is found in the presence of unwanted signals. For systems of the type described, these unwanted signals generally take on the form of information that is correlated with prior information-data samples. In other words, it is often desirable to remove components of the signal that appear the same in each information-data sample (i.e., correlated).

The importance of extracting information of this nature (i.e., correlated) from incoming data samples is clear and well known in diverse applications of data processing, in addition to this requirement for M.T.I.-type radar systems. In particular, "sea clutter", or interference from returns from waves, "chaff" and wind driven interference are factors giving rise to the major portion of correlated signal components of data. For M.T.I. radar and similar type systems, it is obvious that it is the removal of correlated signal components that is desired.

Prior data processing systems of various types and especially M.T.I. type preprocessing systems, have attempted to utilize correlated components between successive prior data samples in modifying incoming data for further processing. But prior techniques generally employ either parallel canceller loops or series iterative loops which function in an equivalent manner. Parallel interactive loops are unsatisfactory because they have longer setting times than independent canceller loops and must employ reduced loop gain to prevent loop-to-lop oscillation. Generally, prior series iterative techniques include undesirable aspects arising from an excessive number of stages. This increases system size and cost, while at the same time reducing system reliability.

In the copending case of Lewis et al previously referred to, a technique is employed which does not resort to iterative parallel or interactive loop techniques. In comparison, the present technique generally requires a fewer number of canceller devices.

The present invention, under certain circumstances, allows design of preprocessing devices achieving essentially the same result as that obtainable by the just cited copending application, but with a fewer number of components. The circumstances referred to generally involve more limited ambient environmental operating conditions. The technique of the present invention not only uses a limited-iterative processing technique but is especially configured.

Accordingly, the present invention has been developed to overcome specific shortcomings of the above known and similar techniques, and to provide a data processing technique for minimizing or enhancing particular aspects of an incoming data sample through resort to extraction of correlated signal components presently received signal sample and prior samples.

SUMMARY OF THE INVENTION

The present invention examines successive data samples in order to extract components correlated between them. The samples are delayed in time to implement their simultaneous comparison. Then components related to components correlated between the compared samples are extracted. These extracted components are utilized to reduce components of the incoming data which are correlated with previous data samples. In this manner, modification of incoming data is achieved before it is further processed. The modification causes removal of undesirable correlated components of immediately prior data samples from the incoming data sample.

It is therefore an object of the present invention to extract correlated information relating successive data samples by resort to a limited-series of iterative means in order to remove undesirable components from an incoming data sample.

Another object of the present invention is to modify an incoming data sample of radar information in order to minimize "clutter", "chaff" or other types of interference.

It is a further object of the present invention to enhance target information to a radar system by removal of undersirable correlated signal components.

Other objects, advantages and novel features of the invention will become apparent from the following detailed description of the invention when considered in conjunction with the accompanying drawings wherein:

DETAILED DESCRIPTION OF THE INVENTION

Figure 1:
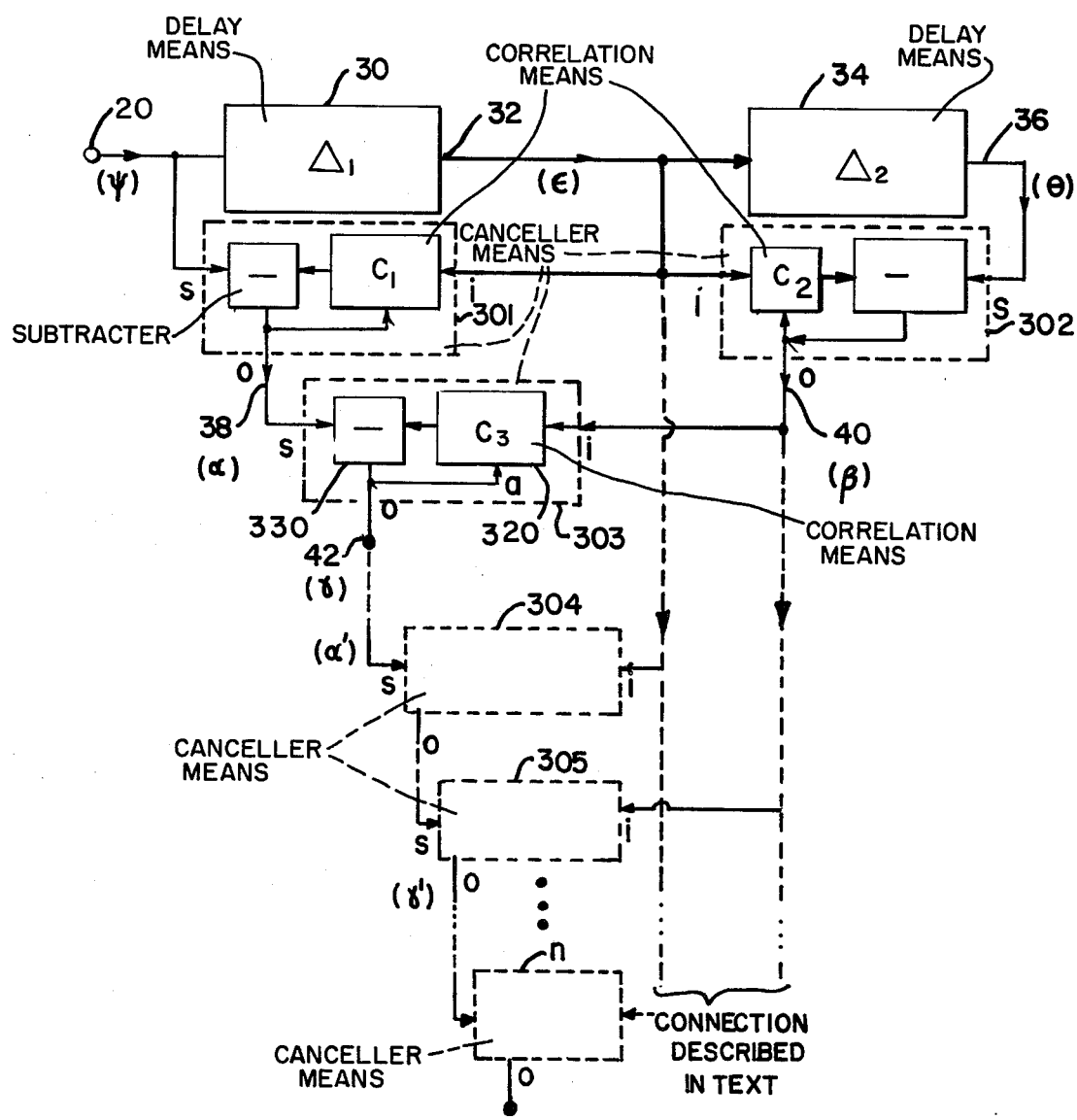
FIG. 1 depicts in block diagram schematic form the described embodiment of the present invention.

Referring to FIG. 1, the schematic diagram shows an embodiment of a Moving Target Indicator radar system data preprocessor according to the present invention. In the preferred embodiment, the invention will be described with reference to a Moving Target Indicator radar system providing return radar signals to a preprocessor input terminal 20. For simplicity, the radar receiver portion has been omitted in the drawing since it contributes nothing to the inventive principle, it being obvious that such receivers are incorporated to receive the antenna signals in a manner well-known in the art. Further, it is to be understood that other types of data gathering systems which provide and utilize serial data samples may be benefited by being utilized in combination with the present invention. Optical pattern recognition systems, signal integration systems, and learning machines, as well as many other types of systems, for example are of this type.

FIG. 1 shows a serial data input terminal 20 connected to the input of a first delay device 30. Delay device 30 has an output terminal 32 connected to the input of a second delay device 34, which has an output terminal 36.

Figure 2:
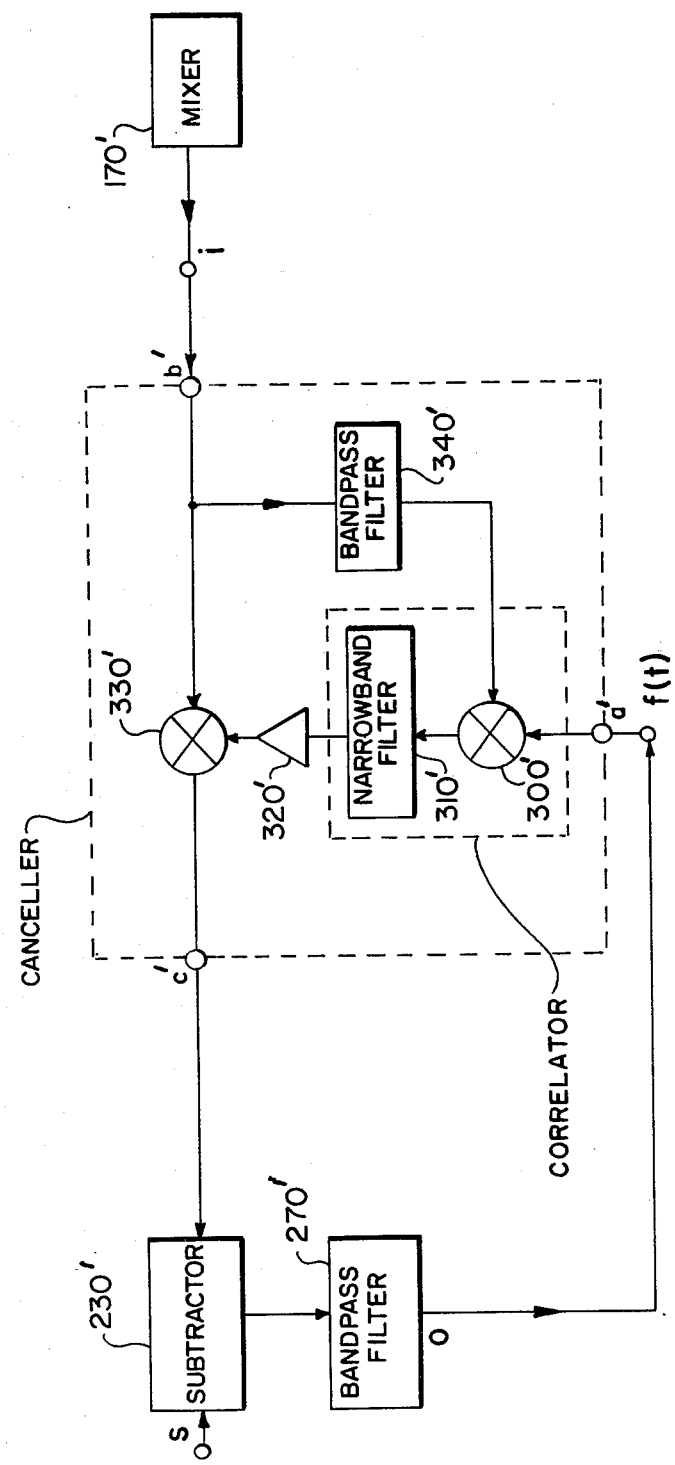
FIG. 2 is a schematic diagram of one form of canceller known to the prior art.

The described embodiment of the present invention utilizes a number of devices 301–305 herein termed "signal-canceller" devices, "cancellers" or "canceller means". Each signal-canceller device has auxiliary input-terminal i, a main input-terminal s, and an output terminal o. Each of these signal-canceller devices 301–305 is comprised of a correlation and weighting device 320 and a subtractor device 330. The auxiliary input-terminal i is connected to the input to the correlation means 320, and the main input-terminal s is connected to a first input of the subtractor 330. The output of the correlation means 320 is connected to the second input terminal of subtractor 330, while the output of subtractor 330 is fed back to a feed back input terminal a' of correlation means 320. It should be understood that the canceller devices utilized in the described embodiment form no part of the present invention. These devices are known in the prior art, and a functional schematic of a typical prior art canceller is shown in FIG. 2. The theory behind the operation of this prior art system is generally taught by the patent to Howells, U.S. Pat. No. 3,202,990, reference to which is hereby made, and will not be discussed in great detail. Generally, however, the canceller is formed from a conventional mixer or multiplier circuit 300' receiving the output from a bandpass filter 270' through input a'. The signal at input b' (from a mixer 170) is applied through filter 340' (having the same time-delay as bandpass filter 270') to a second input to mixer 300'. The signal at input b' is also applied to the input of mixer 330'. The output of mixer 300' is passed through a narrow-band filter 310' and an amplifier 320' to a second input to the mixer 330'. The output signal at terminal c' is then applied to the input to subtractor 230'. While the narrow band filter 310' and amplifier 320' have been shown as separate elements, the same could just as well be replaced by a narrow-band amplifier.

In general, the signal applied at auxiliary input-terminal i is termed g(t), the signal applied at the canceller feedback input-terminal a' is termed f(t) (this signal is also present at output-terminal o), and the signal at the main input-terminal s is termed h(t). The correlation means 320 multiplies its signal g(t) by its signal f(t) and integrates the product to arrive at a correlation coefficient $\sigma$ $$(\text{i.e., } \sigma = \frac{1}{T} \int_0^T f(t)g(t)dt,$$

where T=1/B, and where B is the open loop bandwidth). Then correlation means 320 employs $\sigma$ to phase shift and attenuate g(t) so that it will subtract from h(t) to minimize the correlation between f(t) and g(t), where f(t) =h(t) $-\sigma$g (t$\pm\Delta$t). Thus the canceller attempts to decorrelate its output f(t) at output-terminal o from its auxiliary input signal g(t) at terminal i.

Turning again to FIG. 1, a first signal-canceller device 301 is connected with its main input-terminal s connected to the device input-terminal 20, and its auxiliary input-terminal i connected to output-terminal 32. For illustrative purposes input-terminal 20 is denoted as $\psi$, while the signal at output-terminal 32 is denoted as $\epsilon$. Canceller 301 has an output terminal 38 which provides a signal $\alpha$ proportional to the signal $\psi$ which is uncorrelated with the signal $\epsilon$.

A second signal canceller means 302 is connected with its main input-terminal s connected to output-terminal 36, and its auxiliary input-terminal i connected to output-terminal 32. Its output-terminal "o" 40 provides a signal $\beta$ proportional to the signal at output terminal 36 which is uncorrelated with the signal at output-terminal 32. The signal at output-terminal 36 is denoted as $\theta$.

A third signal canceller 303 is connected with its main input-terminal s connected to output-terminal 38 (i.e. to signal $\alpha$) and its auxiliary input-terminal i connected to output terminal 40 i.e., to signal $\beta$. An output-terminal "o" 42 of signal canceller 303 provides a signal $\gamma$ proportional to the signal at output-terminal 38 which is uncorrelated with the signal at output-terminal 40. The first and third signal cancellers 301, 303 form a pair of component removal devices.

The output-terminal 42 of signal canceller device 303 forms the output-terminal of the described embodiment of the present invention.

Optionally, as shown connected in dotted lines, a number of additional pairs of signal cancellers, or component removers, may be included to provide additional cancellation. The main input-terminal s of each of these optional signal cancellers is connected in a series fashion, with the main input-terminal of one signal canceller connected to the output o of a preceeding signal canceller (beginning with the third signal canceller output-terminal 42). The auxiliary input-terminal i of the first optional signal canceller 304 is connected to delay device output-terminal 32, while the second of the pair (next in series) is connected with its auxiliary input terminal i connected to the second canceller 302 output-terminal 40. Each subsequent optional canceller pair is connected in a fashion similar to that just described for the first two optional signal cancellers 304 and 305, i.e., with the auxiliary input-terminal i of the first signal canceller, connected to delay device output-terminal 32, and the auxiliary input-terminal i of the second signal-canceller of an optional signal-canceller pair connected to output-terminal 40. Of course the output signal of the device will be taken from the output-terminal "o" of the last optional signal-canceller employed.

In many types of information processing systems, information components that are correlated from one sample to the next represent undesirable interference. For example, radar "clutter" results from correlated components at a particular doppler frequency range from one sample to the next, while wind driven rain results in correlated components of a different doppler frequency. Clearly then, it is desirable to prevent these two doppler frequency components from being further processed in a search type radar system.

To reduce unwanted correlated signal components from the input signal $\psi$, signal canceller 301 is used to process input signal $\psi$ with a (delayed) independent input signal-sample $\epsilon$. The signals $\psi$, $\epsilon$ applied to the main and auxiliary terminal s, i, respectively of signal canceller 301 contain both correlated and uncorrelated signal components. Signal canceller 301 attempts to decorrelate its output signal $\alpha$ from the signal $\epsilon$ at its auxiliary signal input terminal. In so doing, it reduces the magnitudes of the signal components correlated between the auxiliary and main input terminals (i.e., signals $\psi$ and $\epsilon$), but it can also introduce components uncorrelated with the signal $\psi$. In other words, signal canceller 301 removes components of signal $\epsilon$ correlated with signal $\psi$, but may introduce components of signal $\epsilon$ uncorrelated with signal $\psi$.

To further reduce unwanted correlated signal components, a second independent sample must be used in conjunction with another signal canceller. This second independent signal $\theta$ is from the output of the second delay means 34 (storing a previous radar return, different from the one stored by delay means 30). In order to prevent reintroduction of the components of signal $\theta$ correlated with $\epsilon$, which were removed from $\psi$ by signal canceller 301, $\theta$ is decorrelated from $\epsilon$ prior to use in signal canceller 303. This is accomplished by the signal canceller 302.

The third signal canceller 303 attempts to decorrelate its output signal $\gamma$ from the signal $\beta$. In so doing, it removes components of signal $\psi$ correlated between $\theta$ and $\psi$ that were not present in $\epsilon$, and does not reintroduce components correlated between $\epsilon$ and $\psi$ that were removed by canceller 301. This process results in increased clutter cancellation by making use of data without reintroducing previously utilized information.

Obviously, the technique of the present invention can be readily extended to simultaneously preprocess more pulses than accomplished by the described embodiment. For each additional pulse desired to be simultaneously processed, an additional delay means (serially connected to the previously described delay means) providing for storage of one additional previous signal and additional signal canceller means for decorrelating will be required. Each additional delay means will have an associated signal canceller. This associated signal canceller will have it's main input terminal s coupled to its associated delay means output terminal and it's auxiliary input terminal i coupled to the output of the signal canceller connected to the preceeding delay means. The associated signal canceller will have an output connected to the auxiliary input terminal i of another additional signal canceller which will be connected serially after signal canceller 303. This second additional signal canceller will have its main input terminal s connected to output terminal 42 (i.e., connected in a fashion similar to that of signal canceller 303). In a manner similar to that previously described for signal canceller 302, the first additional signal canceller with attempt to prevent reintroduction of signal components removed by prior signal canceller. Its output terminal may then serve as the output of this optional embodiment.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A device for preprocessing incoming serial data samples comprising:
   means for receiving sequential serial data samples;
   first and second serially connected delay means, said first delay means being coupled to said receiving means, each said delay means providing an output and being arranged to delay each said incoming data sample such that a plurality of incoming data samples is simultaneously available;
   first extracting means having inputs coupled to the output of said first and second delay means for extracting components correlated between signals applied at said inputs of said first extracting means, said first extracting means having an output terminal for providing a signal decorrelated between signals applied at said inputs of said first extracting means;
   second extracting means having an input coupled to said incoming data sample receiving means and having another input coupled to said output of said first delay means for extracting components correlated between signals applied at said inputs of said second extracting means, said second extracting means having an output terminal at which the signal from said receiving means is present with components correlated between signals applied to said receiving means and said first delay means being reduced; and
   third extracting means having an input coupled to said output terminal of said second extracting means, and having another input coupled to said output terminal of said first extracting means for extracting components correlated between signals applied at said inputs of said third extracting means, said third extracting means having an output terminal at which the output signal from said second extracting means is present but with components correlated between signals from said second extracting means output terminal and said first extracting means output terminal being reduced;
   whereby components correlated between the signal applied at said receiving means and said plurality of simultaneously available data samples are reduced at the output of said third signal extracting means.

2. A device for preprocessing incoming serial data samples comprising:
   means for receiving sequential incoming data samples;
   first delay means being coupled to said receiving means;
   second delay means being coupled to the output of said first delay means, each said delay means having an output terminal and arranged for delaying each said incoming data sample such that a plurality of incoming data samples is simultaneously available;
   a first signal line coupled to the output of said first delay means;
   first signal canceller means having an auxiliary input terminal coupled to said first signal line, a main input terminal coupled to the output of said second delay means, and having an output terminal;
   a second signal line coupled to the output of said first signal canceller means;
   a plurality of pairs of signal canceller means, the first signal canceller means of each pair having a main input terminal, an auxiliary input terminal coupled to said first signal line, and an output terminal, said second signal canceller means of each said pair having a main input terminal coupled to the output of the first signal canceller means of the respective, an auxiliary input terminal coupled to said signal line, and an output terminal,
   said main input terminal of the first canceller means of said pairs being coupled to said signal receiving means, the main input terminal of the first canceller means of each subsequent said pair being coupled to the output of said second canceller means of the preceeding canceller pair, and the output terminal of the last of said pairs of canceller means forming the output of said signal processor, whereby signal components correlated between the signal applied at said receiving means and said plurality of simultaneously available data samples is reduced at the output of said signal processor.

3. The data preprocessing system of claim 1 wherein each of said signal canceller means comprises: canceller means coupled to receive said auxiliary input signal and having a feedback terminal for producing an output signal proportional to the correlation of said auxiliary input signal and a signal applied at said feedback terminal; and means coupled to said canceller means and to said main input signal for subtracting said output signal of said canceller means from said main input signal and having an output terminal connected to said feedback terminal of said canceller means, said output terminal for providing a signal decorrelated from said auxiliary signal.

* * * * *